(12) United States Patent  
Dogu et al.

(10) Patent No.: US 8,595,497 B2
(45) Date of Patent: Nov. 26, 2013

(54) ELECTRONIC FILE SENDING METHOD

(75) Inventors: Toshio Dogu, Tokyo (JP); Noriyuki Takahashi, Tokyo (JP); Hideaki Sugano, Tokyo (JP); Rina Sugano, legal representative, Higashimurayama (JP); Minoru Nishie, Tokyo (JP)

(73) Assignee: Digital Arts Inc., Tokyo (JP)

( * ) Notice: Subject to any disclaimer, the term of this patent is extended or adjusted under 35 U.S.C. 154(b) by 0 days.

(21) Appl. No.: 13/165,801

(22) Filed: Jun. 22, 2011

(65) Prior Publication Data

US 2012/0096268 A1 Apr. 19, 2012

Related U.S. Application Data

(63) Continuation of application No. PCT/JP2009/005230, filed on Oct. 7, 2009.

(30) Foreign Application Priority Data

Dec. 26, 2008 (JP) ................................ 2008-332456

(51) Int. Cl.
*H04L 9/32* (2006.01)
(52) U.S. Cl.
USPC ........... 713/170; 713/168; 713/169; 713/171; 726/26
(58) Field of Classification Search
USPC .................... 713/168–171; 726/26
See application file for complete search history.

(56) References Cited

U.S. PATENT DOCUMENTS 6,385,655 B1 5/2002 Smith et al.
7,143,175 B2 * 11/2006 Adams et al. ................. 709/229
8,260,711 B1 * 9/2012 Wawda et al. ................. 705/57
2003/0046533 A1 3/2003 Olkin et al.
2005/0163320 A1 7/2005 Brown et al.
(Continued)

FOREIGN PATENT DOCUMENTS

JP 2003-337802 A 11/2003
JP 2007-213546 A 8/2007
(Continued)

OTHER PUBLICATIONS

Notice of Preliminary Rejection issued by the Korean Patent Office with mailing date of Jul. 27, 2012 for application No. 10-2011-7012418.
(Continued)

*Primary Examiner* — Jeffrey Pwu
*Assistant Examiner* — Jayesh Jhaveri

(57) ABSTRACT

An electronic file sending method is provided to securely and easily send en electronic file to a receiver. A receiving apparatus receives from a sending apparatus an electronic mail including an encrypted electronic file. The sending apparatus uses a public key of a management server to encrypt a decryption password that is necessary to decrypt the encrypted electronic file and sends the encrypted decryption password to the management server. In association with a file identifier of the electronic file, the management server stores the decryption password and an electronic mail address of a correct receiver, who is a receiver of the receiving apparatus. The receiving apparatus sends to the management server the file identifier of the electronic file and the electronic mail address of the receiver. The management server uses a public key of the receiving apparatus to encrypt the password and sends the encrypted password to the receiving apparatus.

12 Claims, 13 Drawing Sheets

(56) References Cited

U.S. PATENT DOCUMENTS

| | | | |
|---|---|---|---|
| 2006/0230459 A1* | 10/2006 | Lam | 726/26 |
| 2008/0065878 A1* | 3/2008 | Hutson et al. | 713/153 |
| 2008/0215881 A1* | 9/2008 | Cai et al. | 713/165 |
| 2009/0064277 A1* | 3/2009 | Isoda | 726/2 |
| 2009/0178061 A1* | 7/2009 | Sandoval et al. | 719/328 |
| 2009/0187764 A1* | 7/2009 | Astakhov et al. | 713/170 |

FOREIGN PATENT DOCUMENTS

| | | |
|---|---|---|
| JP | 2007-306261 A | 11/2007 |
| WO | 2004/077770 A1 | 9/2004 |
| WO | 2005/076514 A1 | 8/2005 |
| WO | 2006/130585 A2 | 12/2006 |
| WO | 2008/099232 A1 | 8/2008 |

OTHER PUBLICATIONS

Official Action, issued by the Japanese Patent Office for application No. 2008-332456, dated Jun. 6, 2013.

International Search Report (ISR) for International application No. PCT/JP2009/005230 mailed on Dec. 23, 2009.

Translation of Official Action, issued by the Patent Office of the Russian Federation for application No. 2010139237/08(056089), Oct. 7, 2009.

* cited by examiner

ELECTRONIC FILE SENDING METHOD

CROSS REFERENCE TO RELAYED APPLICATION

The contents of Japanese Patent Application No. 2008-332456 filed on Dec. 26, 2008 are incorporated herein by reference.

BACKGROUND

1. Technical Field

The present invention generally relates to an electronic file sending method. More particularly, the present invention relates to a method of sending an encrypted electronic file.

2. Related Art

To send an electronic file via a communication network such as the Internet, the electronic file is generally attached to an electronic mail. This electronic file sending method has the following drawback. All of the data constituting the electronic mail remains in, for example, servers that relay the electronic mail and is easily accessed by a third person.

To avoid this problem, it is known in the art to encrypt the electronic file to be attached to the electronic mail (see Japanese Patent Application Publication No. 2007-306261). According to the technique disclosed in Japanese Patent Application Publication No. 2007-306261, a third person will have difficulties in accessing the content of the encrypted electronic file.

When the electronic file is encrypted to overcome the above-described drawback, the sender of the electronic mail needs to inform the receiver of the electronic mail of a password necessary to decrypt the encrypted electronic file. According to the technique disclosed in Japanese Patent Application Publication No. 2007-306261, while the electronic mail having an encrypted electronic file attached thereto is sent from a personal computer, the password necessary to decrypt the encrypted electronic file is sent from a mobile phone. Here, since the password is sent to a mobile phone network as it is, the password may possibly be accessed by a third person. Thus, the technique disclosed in Japanese Patent Application Publication No. 2007-306261 cannot securely communicate the password to the receiver.

When the above-mentioned electronic file sending method is continuously employed, in particular, over a long time period, both the sender and the receiver are required to manage the password.

The password tends to be vulnerable to dictionary attach (for example, in the case of a short character/number string or a meaningful character string), since the password is typically chosen by a human being. This tendency becomes particularly strong due to the above-mentioned necessity of the password management by both the sender and the receiver.

SUMMARY

In light of the above, it is an object of an aspect of the innovations herein to provide an electronic file sending method for securely and easily sending an electronic file to a receiver.

An electronic file sending method relating to an embodiment of the present invention includes: sending an electronic mail including an encrypted electronic file from a sending apparatus; encrypting at the sending apparatus a password that is necessary to decrypt the encrypted electronic file and sending the encrypted password to a server from the sending apparatus; receiving at a receiving apparatus the electronic mail sent from the sending apparatus; receiving at the server the encrypted password from the sending apparatus, decrypting the encrypted password, and thus obtaining at the server the password; and encrypting at the server the password and sending the encrypted password from the server to the receiving apparatus.

An electronic file sending method relating to another embodiment of the present invention includes: receiving at a receiving apparatus an electronic mail including an encrypted electronic file from a sending apparatus; receiving at the receiving apparatus from a server a password that is necessary to decrypt the encrypted electronic file; receiving at the receiving apparatus from the server permission and prohibition information indicating an operation that is permitted to be performed on or prohibited from being performed on the electronic file; decrypting by the receiving apparatus the encrypted electronic file, using the password, to store the electronic file in a temporary storage region; and performing by the receiving apparatus an operation on the electronic file stored in the temporary storage region, by referring to the permission and prohibition information.

DESCRIPTION OF EXEMPLARY EMBODIMENTS

The following describes in detail the present invention with reference to the attached drawings. Each constituent of the

First Embodiment

Figure 1:
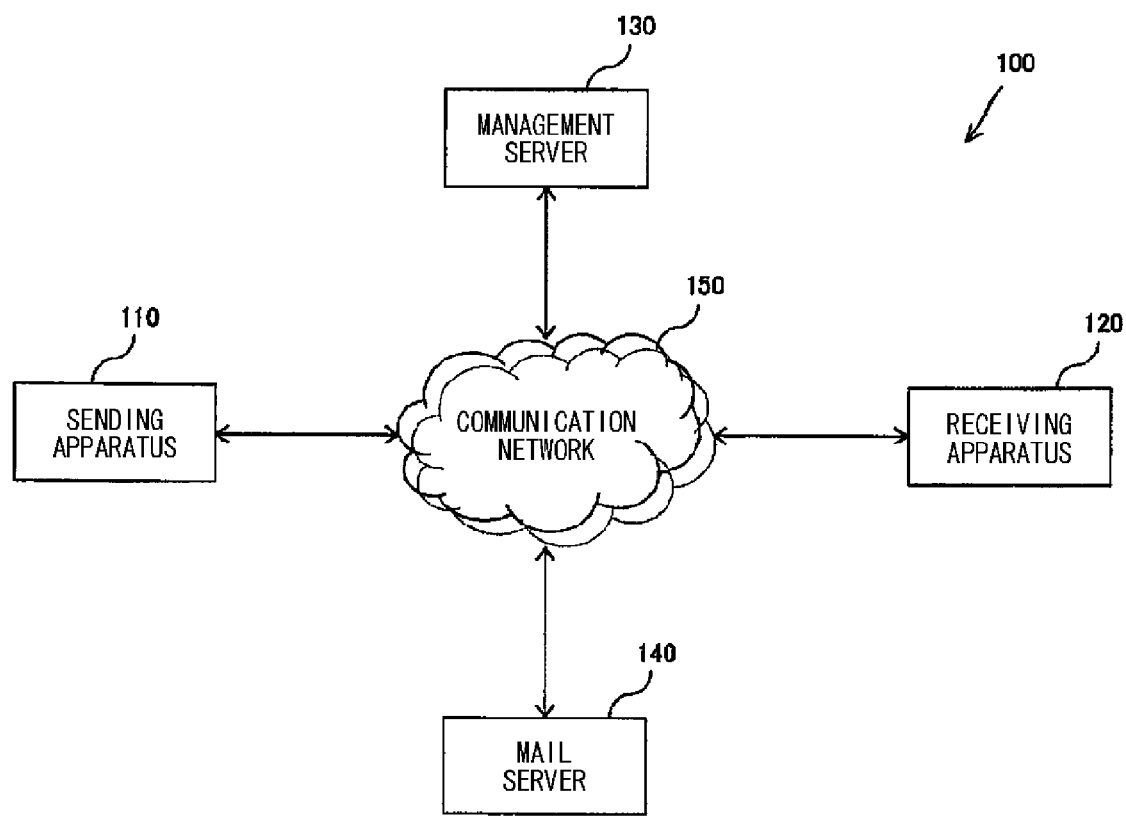
FIG. 1 is a block diagram illustrating an exemplary configuration of a communication system relating to a first embodiment of the present invention.

FIG. 1 is a block diagram illustrating an exemplary configuration of a communication system relating to a first embodiment of the present invention. As shown in FIG. 1, a communication system 100 mainly includes a sending apparatus 110, a receiving apparatus 120, a management server 130, and a mail server 140. These apparatuses and servers are configured connectable to a communication network 150 including the Internet. The communication network 150 may include fixed and mobile communication networks.

The sending apparatus 110 maybe, for example, a personal computer, a mobile phone, a personal digital assistant (PDA) or the like. The sending apparatus 110 sends an electronic mail having an encrypted electronic file attached thereto to the receiving apparatus 120 via the communication network 150.

Similarly, the receiving apparatus 120 may be, for example, a personal computer, a mobile phone, a PDA or the like. The receiving apparatus 120 receives via the communication network 150 the electronic mail sent from the sending apparatus 110.

The mail server 140 receives via the communication network 150 the electronic mail sent from the sending apparatus 110, and sends the received electronic mail to the receiving apparatus 120 via the communication network 150.

The management server 130 transfers a password necessary to decrypt the electronic file encrypted by the sending apparatus 110 from the sending apparatus 110 to the receiving apparatus 120 via the communication network 150.

<The Internal Structures of the Sending and Receiving Apparatuses and the Management Server>

"The Internal structure of the Sending Apparatus 110"

Figure 2:
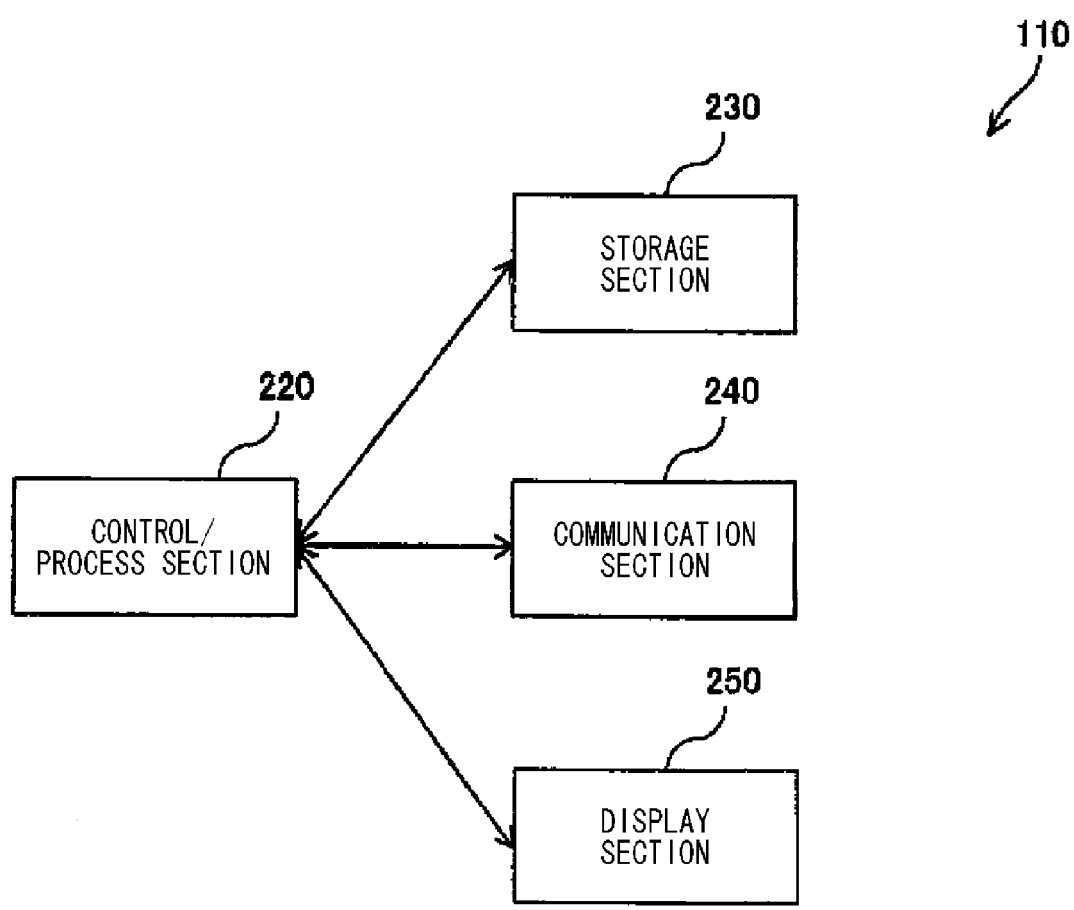
FIG. 2 is a block diagram illustrating an exemplary internal structure of a sending apparatus 110.

FIG. 2 is a block diagram illustrating an exemplary internal structure of the sending apparatus 110.

The sending apparatus 110 mainly includes a control/process section 220, a storage section 230, a communication section 240, and a display section 250.

The storage section 230 stores a variety of information including application programs used to provide the electronic file sending method relating to the first embodiment of the present invention, a public key of the management server 130 (or the receiving apparatus 120), and an electronic file to be sent to the receiving apparatus 120.

The communication section 240 sends an electronic mail to the receiving apparatus 120, sends a password to the management server 130 or the like, under the control of the control/process section 220.

The display section 250 displays the result of the operations performed by the control/process section 220 to the user of the sending apparatus 110 (the sender), under the control of the control/process section 220.

The control/process section 220 controls the storage section 230, the communication section 240, and the display section 250 to realize operations necessary to provide the electronic file sending method relating to the first embodiment of the present invention. Specifically speaking, the control/process section 220 executes the application programs stored on the storage section 230 to control the storage section 230, the communication section 240 and the display section 250, thereby realizing the operations necessary to provide the electronic file sending method relating to the first embodiment of the present invention, which include, for example, encrypting the electronic file, sending the electronic mail having the encrypted electronic file attached thereto, and sending a password necessary to decrypt the encrypted electronic file.

"The Internal Structure of the Management Server 130"

Figure 3:
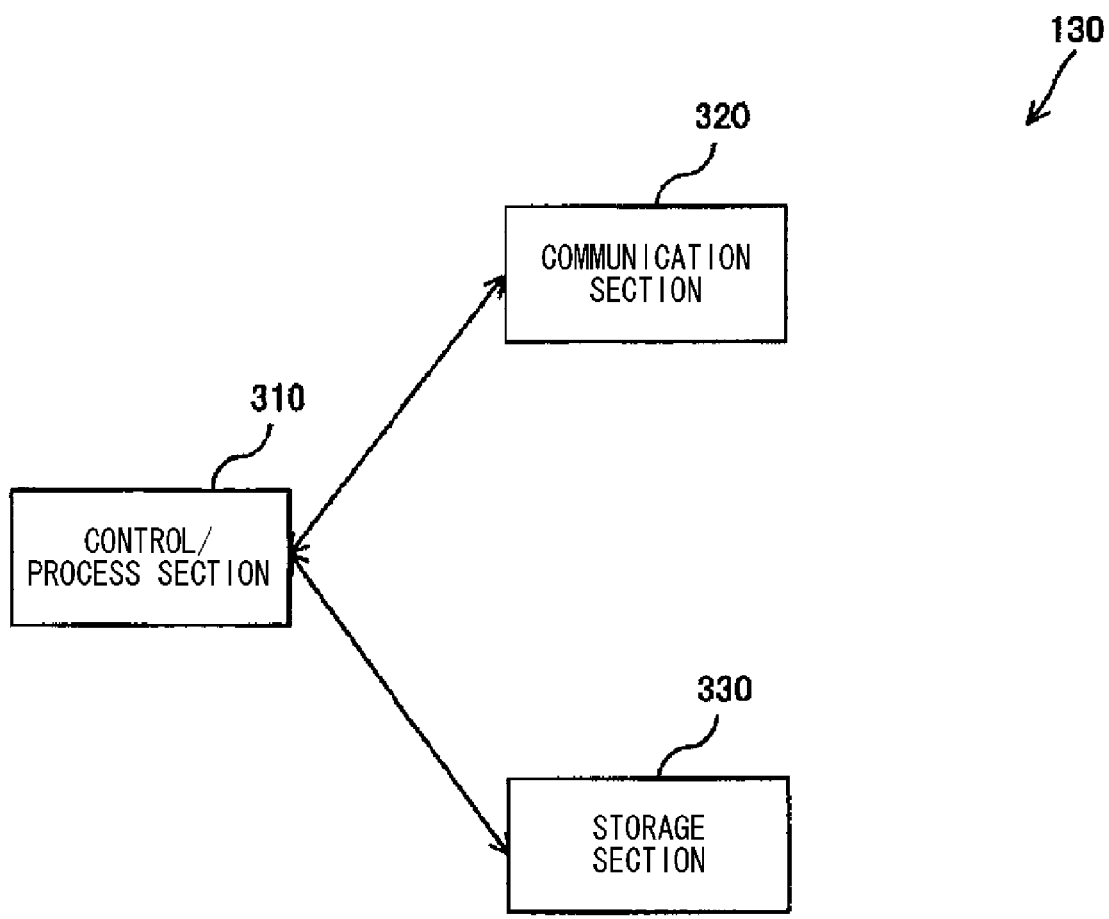
FIG. 3 is a block diagram illustrating an exemplary internal structure of a management server 130.

FIG. 3 is a block diagram illustrating an exemplary internal structure of the management server 130.

The management server 130 mainly includes a control/process section 310, a communication section 320, and a storage section 330.

The storage section 330 stores a variety of information including application programs used to provide the electronic file sending method relating to the first embodiment of the present invention, the password received from the sending apparatus 110, and an identifier that can uniquely identify the electronic file sent from the sending apparatus 110 to the receiving apparatus 120.

The communication section 320 is controlled by the control/process section 310 to communicate with the sending apparatus 110 (receiving the password or the like from the sending apparatus 110) and communicate with the receiving apparatus 120 (sending the electronic mail to the receiving apparatus 120, receiving a public key from the receiving apparatus 120, and sending the password to the receiving apparatus 120).

The control/process section 310 controls the communication section 320 and the storage section 330 to realize operations necessary to provide the electronic file sending method relating to the first embodiment of the present invention. Specifically speaking, the control/process section 310 executes the application programs stored on the storage section 330 to control the storage section 330 and the communication section 320, thereby realizing operations necessary to provide the electronic file sending method relating to the first embodiment of the present invention, which include, for example, receiving the password or the like from the sending apparatus 110 and sending the password to the receiving apparatus 120).

"The Internal Structure of the Receiving Apparatus 120"

Figure 4:
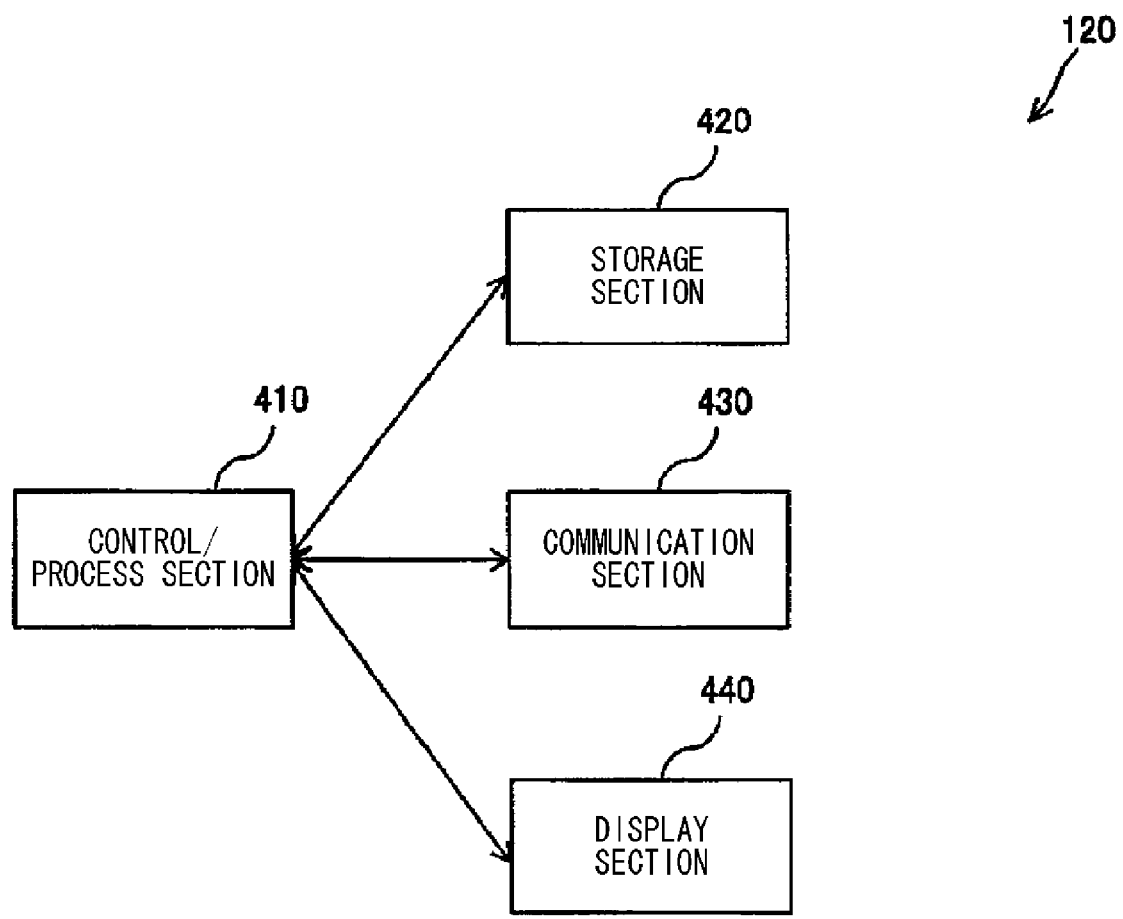
FIG. 4 is a block diagram illustrating an exemplary internal structure of a receiving apparatus 120.

FIG. 4 is a block diagram illustrating an exemplary internal structure of the receiving apparatus 120.

The receiving apparatus 120 mainly includes a control/process section 410, a storage section 420, a communication section 430, and a display section 440.

The storage section 420 stores a variety of information including application programs used to provide the electronic file sending method relating to the first embodiment of the present invention and a secret key of the receiving apparatus 120.

The communication section 430 is controlled by the control/process section 410 to receive the electronic mail from the sending apparatus 110, receive the electronic mail from the management server 130, receive the password from the management server 130, and the like.

The display section 440 displays the result of the operations performed by the control/process section 410 to the user of the receiving apparatus 120 (the receiver) under the control of the control/process section 410.

The control/process section 410 controls the storage section 420, the communication section 430 and the display section 440 to realize the operations necessary to provide the electronic file sending method relating to the first embodiment of the present invention. Specifically speaking, the control/process section 410 executes the application programs stored on the storage section 420 to control the storage section 420, the communication section 430 and the display section 440, thereby realizing the operations necessary to provide the electronic file sending method relating to the first embodiment of the present invention, which include, for example, receiving the electronic mail from the sending apparatus 110, sending a public key to the management server 130, and receiving the password from the management server 130.

<The Flow of the Electronic File Sending Method>

The following generally describes the operations included in the electronic file sending method performed by the communication system relating to the first embodiment.

"The Operations Performed Between the Sending Apparatus 110 and the Management and Mail Servers 130 and 140"

Figure 5:
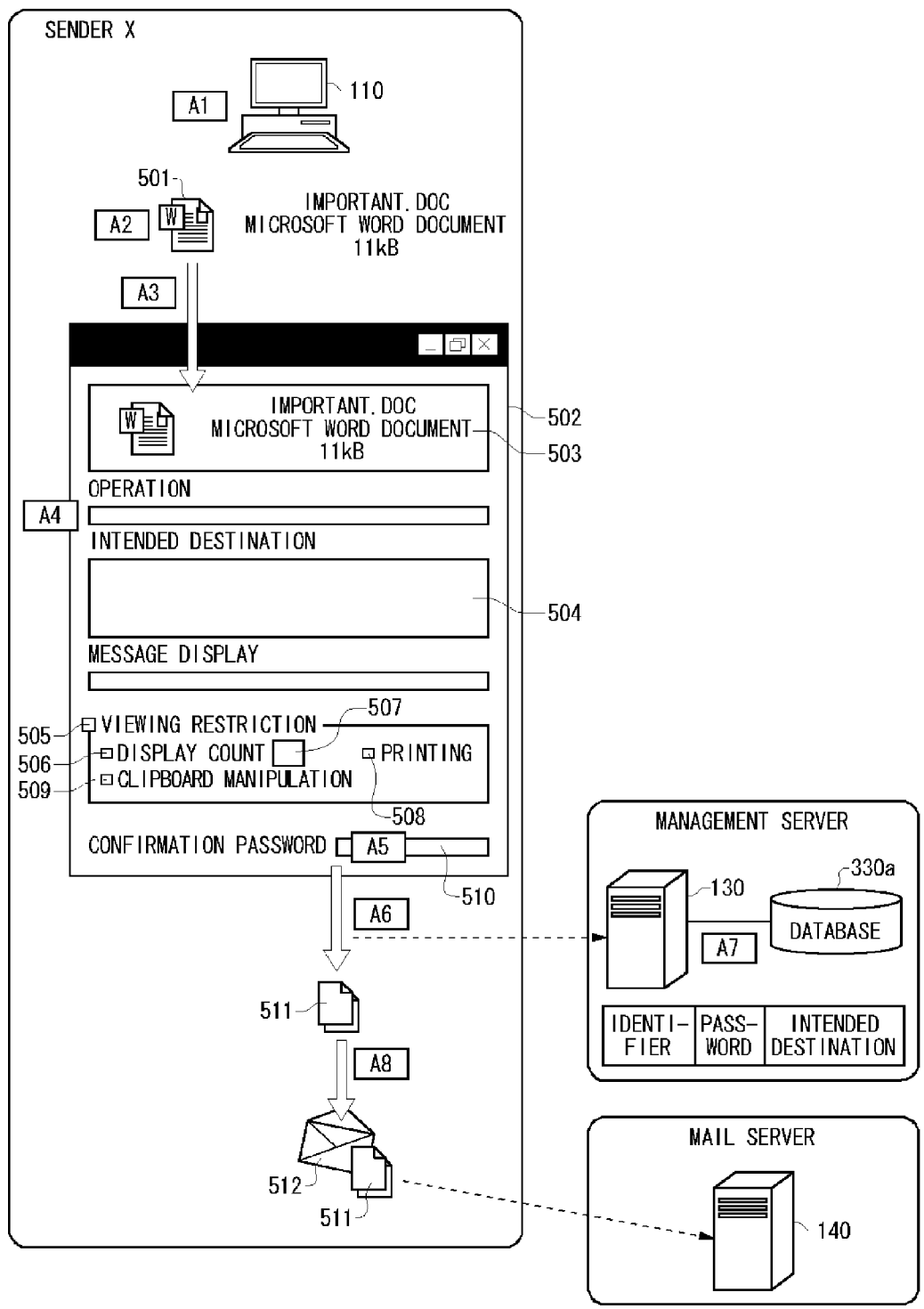
FIG. 5 schematically illustrates the operations performed between a sending apparatus and management and mail servers for an electronic file sending method relating to the first embodiment of the present invention.

FIG. 5 schematically illustrates the operations performed between the sending apparatus 110 and the management and mail servers 130 and 140 for the electronic file sending method relating to the first embodiment of the present invention.

In a step A1, a dedicated application is installed in advance in the sending apparatus 110.

In a step A2, a sender X, who is the user of the sending apparatus 110 uses an application such as Office® to create an electronic file to be sent to a receiver Y, who is the user of the receiving apparatus 120. FIG. 5 shows a Word® file 501 as an example of the created electronic file.

In a step A3, the sender X designates the electronic file 501 as an electronic file for which secure sending is desired, on the dedicated application. Specifically speaking, the display section 250 of the sending apparatus 110 displays a window 502 by means of the dedicated application. While the window 502 is being displayed, the sender X drags the electronic file 501 to a field 503 within the window 502 in order to designate the electronic file 501 as a to-be-sent file.

In a step A4, the sender X designates, on the dedicated application, the electronic mail address of a receiver who is permitted to open the file (here, the receiver Y). Specifically speaking, the sender X inputs the electronic mail address of the receiver Y into a "intended destination" field 504.

Furthermore, the sender X designates, on the dedicated application, manipulations which the receiver Y is permitted to perform or prohibited from performing on the electronic file 501. Specifically speaking, for example, the sender X does not check a "viewing restriction" field 505 when permitting the receiver Y to perform all of the manipulations on the electronic file 501. On the other hand, the sender X checks the "viewing restriction" field 505 when the sender X desires to put some restriction on the manipulations of the electronic file 501. If the sender X desires to limit the number of times the electronic file 501 can be viewed, the sender X checks a "viewing count" field 506 and inputs into a field 507 the number of times the electronic file 501 can be viewed. If the sender X desires to prohibit the electronic file 501 from being printed, the sender X checks a "printing" field 508. Similarly, if the sender X desires to prohibit a clipboard manipulation on the electronic file 501, the sender X checks a "clipboard manipulation" field 509.

The information input by the sender X in the above manner is stored as "viewing permission and prohibition information". This viewing permission and prohibition information is used in order to allow the sender X to control (permit and/or prohibit) the operations (manipulations) that may be performed by the receiver Y on the electronic file 501. The specific techniques to realize this control function will be described later in connection with a second embodiment.

In a step A5, the sender X inputs a password necessary to decrypt the electronic file 501 (hereinafter, referred to as the "decryption password") into a "confirmation password" field 510. Alternatively, the dedicated application may be capable of randomly generating a password and using the generated password as the decryption password, without requiring the sender X to input the decryption password. In this manner, the decryption password can be a common key having the maximum length in the cryptosystem used.

In a step A6, the dedicated application uses the decryption password input or generated in the step A5 to encrypt the electronic file 501 designated as the to-be-sent file. Furthermore, the dedicated application can compress the electronic file 501. In addition, the dedicated application generates a file identifier that can uniquely identify an encrypted (and compressed) electronic file 511.

Furthermore, the dedicated application encrypts the decryption password using the public key of the management server 130. In place of the public key of the management server 130, the dedicated application may use the public key of the receiving apparatus 120.

After this, the dedicated application sends, to the management server 130, the electronic mail address of the receiver Y, the viewing permission and prohibition information, the file identifier, and the encrypted decryption password.

In a step A6, the information sent from the sending apparatus 110 to the management server 130 is received by the management server 130 via the communication network 150. Furthermore, the encrypted decryption password is decrypted by using the secret key of the management server 130 (the secret key that is associated with the public key used by the sending apparatus 110). As a result, the decryption password can be obtained.

In a subsequent step A7, the electronic mail address of the receiver Y, the file identifier, the viewing permission and prohibition information, and the decryption password are stored in association with each other in a database 330a, which forms a part of the storage section 330. Specifically speaking, the file identifier is used as a key, and the electronic mail address of the receiver Y (the intended destination address), the viewing permission and prohibition information and the decryption password are stored in the database 330a in association with the file identifier.

Back to the reference to the sending apparatus 110, in a step A8, the dedicated application sends an electronic mail 512 having the encrypted electronic file 511 attached thereto. The electronic mail 512 is sent to the receiving apparatus 120 via the mail server 140.

"The Operations Performed Between the Receiving Apparatus 120 and the Management and Mail Servers 130 and 140 (Before User Registration is Completed)"

On reception of the electronic mail address of the receiver Y from the sending apparatus 110 in the step A6, the management server 130 judges whether the receiver Y is registered as a user at the management server 130. Here, a case is assumed where the receiver Y is not registered as a user.

Figure 6:
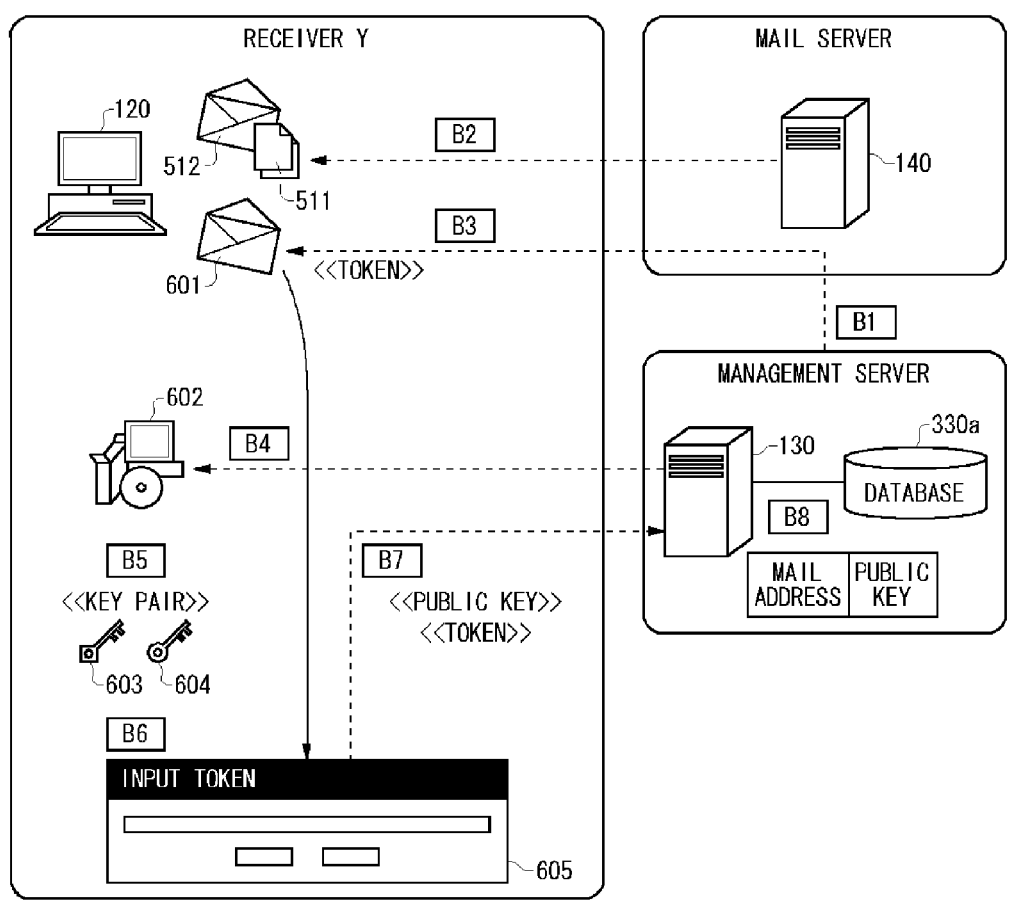
FIG. 6 schematically illustrates the operations performed between a receiving apparatus and management and mail servers for the electronic file sending method relating to the first embodiment of the present invention.

FIG. 6 schematically illustrates the operations performed between the receiving apparatus 120 and the management and mail servers 130 and 140 for the electronic file sending method relating to the first embodiment of the present invention.

In a step B1, the management server 130 generates an electronic mail 601 including, for example in its main part, a token (a data sequence) that is generated based on random information. The main part of the electronic mail 601, for example, further includes the URL of the website that provides an installer of a dedicated application (a viewer). In the first embodiment, the URL is the URL of the management server 130, for example. The management server 130 sends the electronic mail 601 to the receiving apparatus 120.

In a step B2, the receiving apparatus 120 receives the electronic mail 512 sent (in the step A8) from the sending apparatus 110, via the mail server 140. At this stage, the receiving apparatus 120 cannot open the encrypted electronic file 511 attached to the received electronic mail 512, since it does not have a decryption password.

In a step B3, the receiving apparatus 120 receives the electronic mail 601 sent (in the step B1) from the management server 130. The electronic mail 601 has the token and the URL in its main part, as discussed above.

In a step B4, the receiver Y clicks the URL written in the main part of the electronic mail 601, such that the receiving apparatus 120 uses the URL to access the management server 130 to download an installer 602 of the dedicated application (the viewer) from the management server 130. After this, the receiving apparatus 120 executes the downloaded installer 602 to install the dedicated application (the viewer).

At the time of the install, as shown as a step B5, the installer 602 generates an asymmetric key pair, in other words, a secret key 603 and a corresponding public key 604. The generated secret key 603 is implicitly stored.

Furthermore, at the time of the install, the installer 602 causes the display section 440 to display a dialogue box 605 and requests the receiver Y to input the token written in the main part of the electronic mail 601, as shown as a step B6.

On completion of the install of the dedicated application (the viewer), in a step B7, the activated dedicated application sends, to the management server 130, the public key 604 generated in the step B5 and the result obtained by encrypting the token input in the step B6 using the secret key 603 generated in the step B5. Alternatively, the dedicated application may send to the management server 130 the token input in the step B6 without encryption.

In a step B8, the public key and the encrypted token sent from the receiving apparatus 120 are received by the management server 130. The management server 130 decrypts the encrypted token received from the receiving apparatus 120, by using the received public key. The management server 130 judges that the receiver Y is a correct registered user when the decrypted token matches the token sent from the management server 130 in the step B1, and registers the receiver Y as a user. Specifically speaking, the management server 130 stores the electronic mail address of the receiver Y and the public key in association with each other in the database 330a. In other words, the received public key is stored on the database 330a in association with the electronic mail address of the receiver Y, as the correct public key of the receiver Y. In this manner, the user registration of the receiver Y is completed.

In the step B5, the secret key and the public key are generated by the installer according to the above description, but may be instead generated by the dedicated application (the viewer) installed by the installer.

In the step B6, the receiver Y is requested by the installer to input the token, but may be instead requested by the dedicated application installed by the installer, for example, at the initial activation of or prior to the initial use of the application.

"The Operations Performed Between the Receiving Apparatus 120 and the Management and Mail Servers 130 and 140 (After User Registration is Completed)"

As described above, the management server 130 judges whether the receiver Y is registered as a user at the management server 130 when receiving the electronic mail address of the receiver Y from the sending apparatus 110 in the step A6. Here, a case is assumed where the receiver Y has already been registered as a user.

Figure 7:
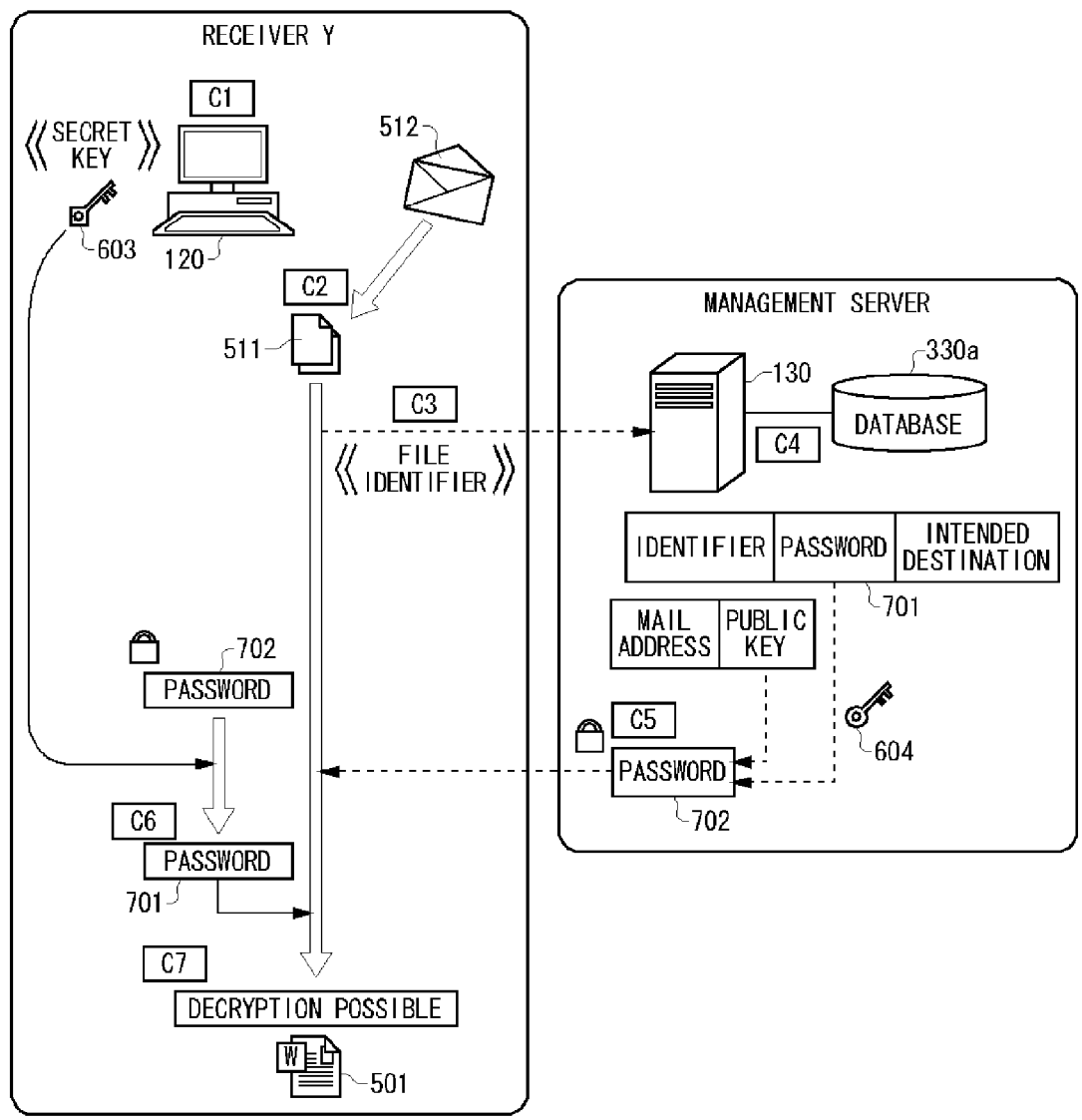
FIG. 7 schematically illustrates the operations performed between the receiving apparatus and the management and mail servers for the electronic file sending method relating to the first embodiment of the present invention.

FIG. 7 schematically illustrates the operations performed between the receiving apparatus 120 and the management and mail servers 130 and 140 for the electronic file sending method relating to the first embodiment of the present invention.

Since the receiver Y has already been registered as a user, as shown as a step C1, the receiving apparatus 120 has the secret key 603 and the management server 130 has the public key 604 corresponding to the secret key 603 in the database 330a.

In a step C2, the dedicated application (the viewer) is activated at the receiving apparatus 120. The receiver Y attempts to open the encrypted electronic file 511 received in the mail 512, by using the viewer.

In a step C3, the viewer sends to the management server 130 the electronic mail address identifying the receiver Y (i.e., the electronic mail address of the receiver Y) and the file identifier extracted from the encrypted electronic file 511.

In a step C4, the management server 130 uses the file identifier received from the receiving apparatus 120 as a key to acquire intended destination addresses stored (in the step A7) in association with the received file identifier, and searches the acquired intended destination addresses to determine whether the electronic mail address of the receiver Y, which is received from the receiving apparatus 120, is included. In other words, the management server 130 judges whether the receiver Y is designated by the sender X as a correct receiver who is permitted to access the electronic file that is uniquely identified by the file identifier received from the receiving apparatus 120.

When judging that the receiver Y is a correct receiver, the management server 130 extracts from the database 330a a decryption password 701 stored (in the step A7) in association with the received file identifier in a step C5. Furthermore, the management server 130 extracts from the database 330a the public key 604 of the receiving apparatus 120 stored (in the step B8) in association with the receiver Y. In addition, the management server 130 encrypts the decryption password 701 by using the public key 604, and sends an encrypted password 702 to the receiving apparatus 120.

In a step C6, the receiving apparatus 120 receives the encrypted password 702. The viewer activated on the receiving apparatus 120 uses the secret key 603 stored on the receiving apparatus 120 to decrypt the encrypted password 702, thereby obtaining the decryption password 701.

In a step C7, the viewer uses the decryption password 701 to decrypt the encrypted electronic file 511 attached to the electronic mail 512, thereby obtaining the electronic file 501. As is apparent from the above description of the steps C2 to C7, the receiver needs to have the viewer activated in order to decrypt the encrypted electronic file. In addition, every time the viewer desires to decrypt the encrypted electronic file, the viewer needs to access the management server to obtain the password necessary for the decryption. Therefore, when the receiver accesses the management server 130 in order to obtain the password to decrypt the encrypted electronic file, the management server 130 may record, for example, the identity of the receiver and the access time in association with the file identifier. According to this configuration, the sender can know when the receiver opens the file by referring to the record kept in the management server 130 since the receiver always needs to access the management server 130 to decrypt the electronic file.

As described above, the first embodiment of the present invention can highly securely encrypt an electronic file and thus can prevent a third person from opening the electronic file even if the third person succeeds in obtaining the electronic file.

The password necessary to decrypt the encrypted electronic file is encrypted by using a public key of an intended receiver designated by the sender or a public key of the management server and then transmitted, instead of being transmitted over a network as it is. Therefore, a third person may obtain the encrypted password but can never decrypt the encrypted password without a corresponding secret key.

Even if the management server is not reliable, a third person is still prevented from decrypting the encrypted electronic file since the management server only manages the password necessary to decrypt the encrypted electronic file and does not manage the electronic file itself.

The management server receives, from a sender of an electronic file, information identifying the electronic file (for example, a file identifier) and information identifying a correct receiver for the electronic file (for example, the electronic mail address of the receiver) and manages the received information. A receiver sends, to the management server, information identifying an electronic file that is desired to be decrypted (a file identifier) and information identifying the receiver (an electronic mail address), to request an encrypted password from the management server. In response to this request, the management server compares the file identifier and the electronic mail address received from the receiver with the file identifier and the electronic mail address received from the sender, to reliably and automatically judge whether it is a correct receiver who is attempting to decrypt a received file. Therefore, an electronic file is reliably obtained only by a correct receiver designated by a sender of the electronic file.

The password transmission from the sending apparatus to the receiving apparatus via the management server is conducted by application programs installed at the apparatuses. Therefore, both the sender and the receiver are saved from becoming aware of a password and further not required to manage a password.

As a consequence, the first embodiment of the present invention can transmit an electronic file securely and reliably to a correct receiver.

The first embodiment described above is the most preferable embodiment, where a password necessary to decrypt an electronic file is encrypted by using a public key and decrypted by using a secret key corresponding to the public key, that is to say, the password necessary to decrypt the electronic file is encrypted and decrypted by using asymmetrical cryptosystem, between the sending apparatus 110 and the management server 130 and between the management server 130 and the receiving apparatus 120. However, the first embodiment of the present invention is applicable to a case where a password necessary to decrypt an electronic file is encrypted and decrypted by using secret key cryptosystem.

In the case of the secret key cryptosystem, between the sending apparatus 110 and the management server 130, in the step A6, the sending apparatus 110 uses a first secret key to encrypt the electronic file 501, uses a second secret key to encrypt the first secret key, and sends to the management server 130 the first secret key encrypted by using the second secret key. The management server 130 decrypts the encrypted first secret key by using the second secret key, to obtain the first secret key. This first secret key is stored on the management server 130 as a decryption password in the step A7. Therefore, the sending apparatus 110 and the management server 130 need to have the second secret key in advance.

On the other hand, between the receiving apparatus 120 and the management server 130, in the step B7, the public key is replaced with a secret key (here, referred to as "a third secret key" for the sake of intelligibility) and another secret key (here, referred to as "a fourth secret key") are used. Specifically speaking, the receiving apparatus 120 sends to the management server 130 the third secret key encrypted by using the fourth secret key and the token encrypted by using the third or fourth secret key. In the step B8, the management server 130 decrypts the encrypted third secret key by using the fourth secret key to obtain the third secret key, and decrypts the encrypted token by using the third or fourth secret key to obtain the token. In the step C5, the management server 130 encrypts the decryption password by using the third secret key and sends the encrypted decryption password to the receiving apparatus 120. In the step C6, the receiving apparatus 120 decrypts the encrypted decryption password by using the third secret key to obtain the decryption password. Therefore, the receiving apparatus 120 and the management server 130 need to have the fourth secret key in advance.

Second Embodiment

According to a second embodiment, a sender of an electronic file controls (permits and/or prohibits) operations (manipulations) a receiver of the electronic file is allowed to perform in the electronic file sending method relating to the first embodiment.

Note that the following description does not include a detailed explanation of the common features shared by the first and second embodiments.

Figure 8:
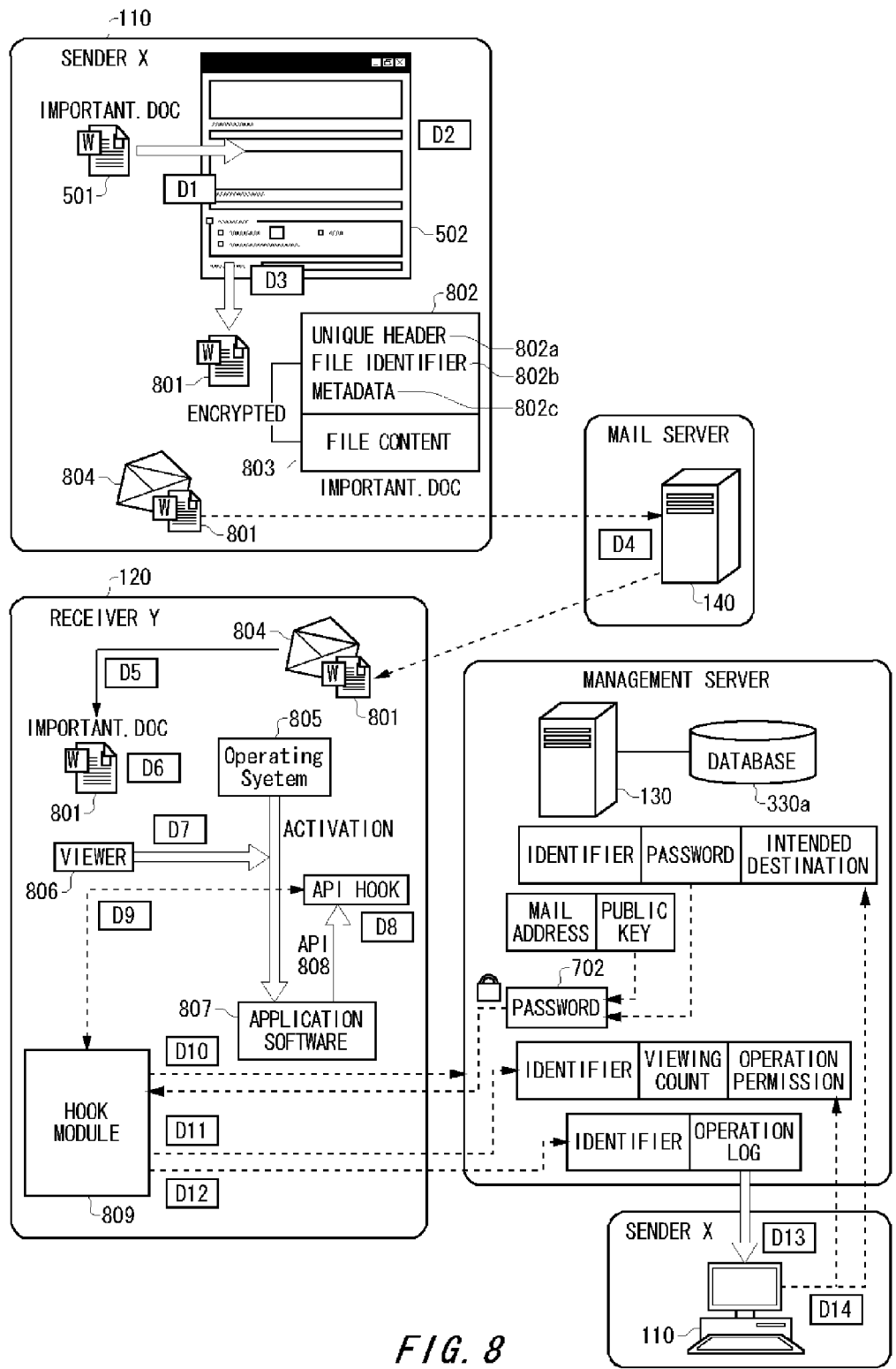
FIG. 8 schematically illustrates the operations included in an electronic file sending method relating to a second embodiment of the present invention.

FIG. 8 schematically illustrates the operations included in the electronic file sending method relating to the second embodiment of the present invention. Here, a case is assumed where the receiver Y has already been registered as a user at the management server 130.

In a step D1, the sender X designates, on the dedicated application, the Word® file 501 as a to-be-sent file, similarly to the step A3. In a step D2, the sender X designates the electronic mail address of a receiver who is permitted to open the file (here the receiver Y), similarly to the step A4. Furthermore, the sender X designates manipulations the receiver Y is permitted to perform or prohibited from performing on the electronic file 501, similarly to the step A4.

In a step D3, the dedicated application uses the input or generated decryption password to encrypt (and then compress) the electronic file 501 designated as a to-be-sent file, similarly to the step A6. After this, the dedicated application sends, to the management server 130, the electronic mail address of the receiver Y, the viewing permission and prohibition information, the file identifier, and the encrypted decryption password, similarly to the step A6. The management server 130 processes these pieces of information in the same manner as described above in connection with the steps A6 and A7.

In the step D3, the dedicated application can assign the same file name to an encrypted electronic file 801 as the original electronic file 501. In other words, the file name of the encrypted electronic file 801 can be made the same as the file name of the electronic file 501 (Imporant.doc).

In the encrypted electronic file 801, a header portion 802 has a file identifier 802b. The header portion 802 also has a header 802a indicating that the electronic file 801 has a unique format. The header portion 802 can also have metadata 802c. For example, the metadata 802c can include information representative of the copyrights and the edition history of the electronic file 501. The metadata 802c may be encrypted as well as the original file content 803.

In a step D4, the dedicated application sends an electronic mail 804 having the encrypted electronic file 801 attached thereto, similarly to the step A8. The electronic mail 804 is received by the receiving apparatus 120 via the mail server 104.

In a step D5, the receiving apparatus 120 has the dedicated application (the viewer) activated, similarly to the step C2.

The receiver Y uses the viewer to open the encrypted electronic file 801, which is received in the electronic mail 804.

In a step D6, the encrypted electronic file 801 has the same file name as the electronic file 501, but has a unique format and cannot be simply opened. However, the second embodiment of the present invention saves the user from becoming aware of this fact, and an operating system (OS) 805 executes the open manipulation for the electronic file 801 as described in the following.

In a step D7, the viewer 806 is configured to monitor an application activation operation by the OS 805. When detecting that a particular application (here, Word®) 807 is activated by the OS 805, which is speculated based on the open of the encrypted electronic file 801, the viewer 806 utilizes API hook to replace the operations of an API module 808 called by the particular application 807 with the operations of a unique hook module 809. Therefore, when the OS 805 activates Word® by referring to the extension (.doc) of the electronic file 801, the viewer 806 detects that the OS 805 activates the particular application 807, that is, Word® and uses the API hook to call the unique hook module 809.

In a step D8, the activated particular application 807 invokes (calls) the API module prepared by the OS 805 in order to access the contents of the file. In a step D9, however, the operations of the called API module are not actually performed. Instead, the operations of the unique hook module 809, which is called due to API hook, are actually performed. The unique hook module 809 determines whether the header portion 802 of the encrypted electronic file 801 has the header 802*a* (added in the step D3), in relation to the access to the encrypted electronic file 801.

When the header portion 802 does not have the header 802*a*, the unique hook module 809 judges that the electronic file 801 does not have the unique format (i.e., judges that the electronic file 801 is a normal Word® file) and the operations that are normally performed by the OS 805 for a Word® file are executed (in other words, the operations of the API module called in the step D9 are performed).

On the other hand, when the header portion 802 has the header 802*a*, the unique hook module 809 judges that the electronic file 801 has the unique format and a step D10 and any subsequent steps described below are performed.

In a step D10, the viewer 806 (the unique hook module 809) sends to the management server 130 the electronic mail address of the receiver Y and the file identifier, similarly to the step C3. In response to this, the operations described in relation to the steps C4 and C5 are performed by the management server 130. As a result, the receiving apparatus 120 receives from the management server 130 the encrypted password 702. Therefore, the viewer 806 (the unique hook module 809) obtains the decryption password 701 similarly to the step C6, and uses the decryption password 701 to decrypt the encrypted electronic file 801, thereby obtaining the electronic file 501, similarly to the step C7.

When the receiver Y is not registered as a user by the management server 130, the steps B1 to B8 described with reference to FIG. 6 are performed.

The following describes in more detail the operations performed in the steps D8 to D10, with a particularly great focus on the API hook.

"General Idea of the API Hook"

The following first describes the general idea of the API hook.

(1) API stands for Application Program Interface and refers to a collection of OS functions that can be utilized to store applications within an OS. A given application combines together some or all of the API modules prepared by an OS in order to cause the OS to execute a particular function desired by the given application.

Figure 9:
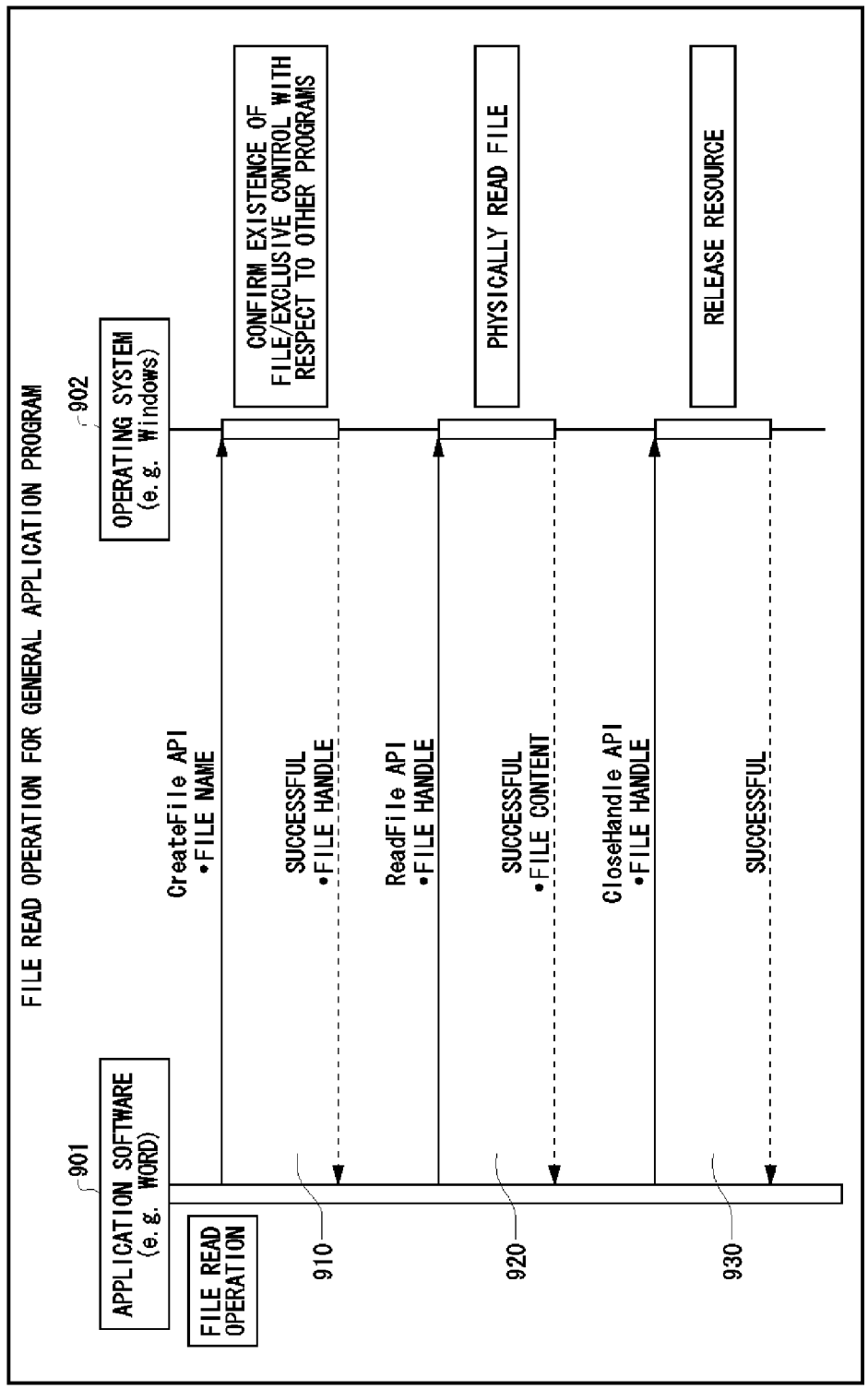
FIG. 9 schematically illustrates a file read operation performed by a general application.

Take as an example an application that reads a file (for example, Word®) on Windows®. The application generally performs operations described in FIG. 9, which schematically illustrates a file read operation performed by a general application.

In a step 910, an application 901 designates a file name, calls a CreateFile API, and opens a file. In a step 920, the application 901 designates the identifier of the opened file (HANDLE), calls a ReadFile API, and obtains the content of the opened file. In a step 930, the application 901 uses CloseHandle API to release the finished file.

As is apparent from the above recitation, the devices and resources are managed by the OS 902 and the application 901 always calls some APIs to use OS functions. In other words, the application 901 accesses the devices and resources by requesting the OS 902 to perform operations through published APIs.

Figure 10:
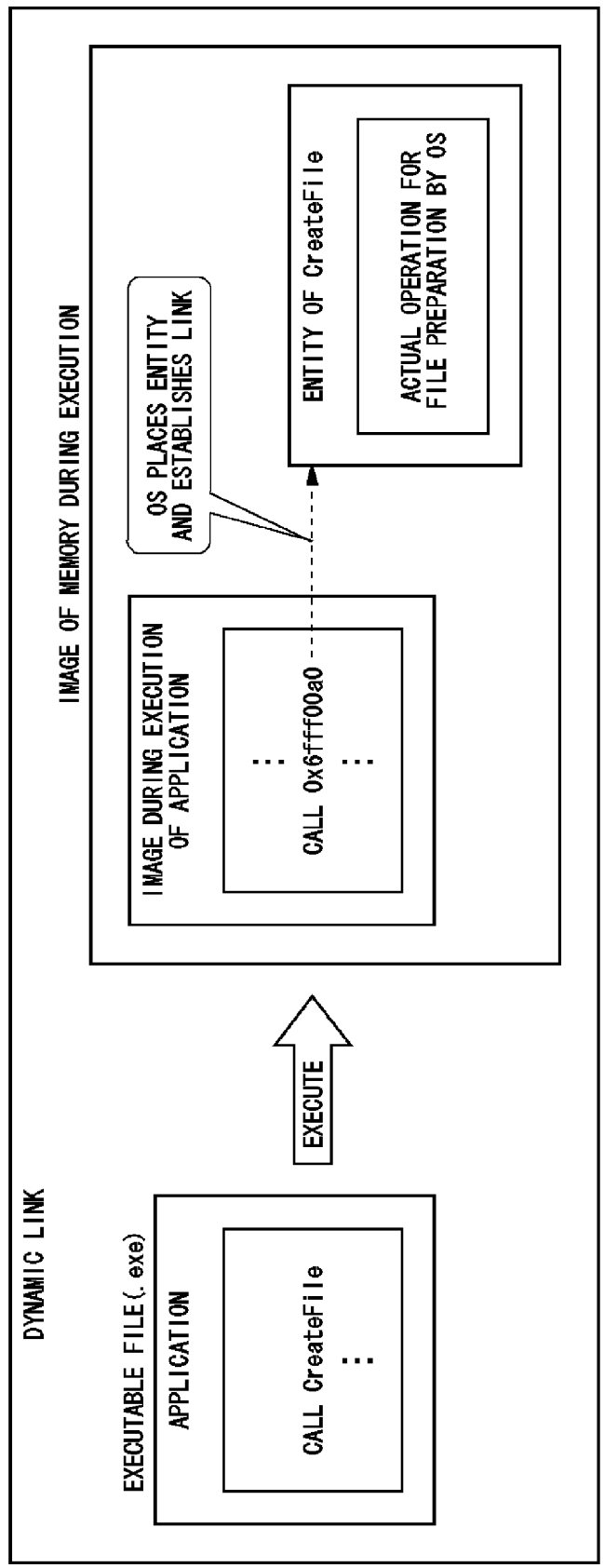
FIG. 10 is a schematic view illustrating the idea of dynamic link.

(2) A list of APIs used by an application program is described in an executable file of the application program. At the time of activation of the application program, an OS places on a memory the entities of the APIs required by the activated application program, and links the addresses of the APIs on the memory with API calls described in the application program. In this way, the memory is rewritten, as shown in FIG. 10, in such a manner that, in response to a description of "Call CreateFile API" in the application program, an operation of "Call a function at 0x6fff00a0" is actually performed. Here, the entity of CreateFile has already been placed on the memory in advance.

Figure 11:
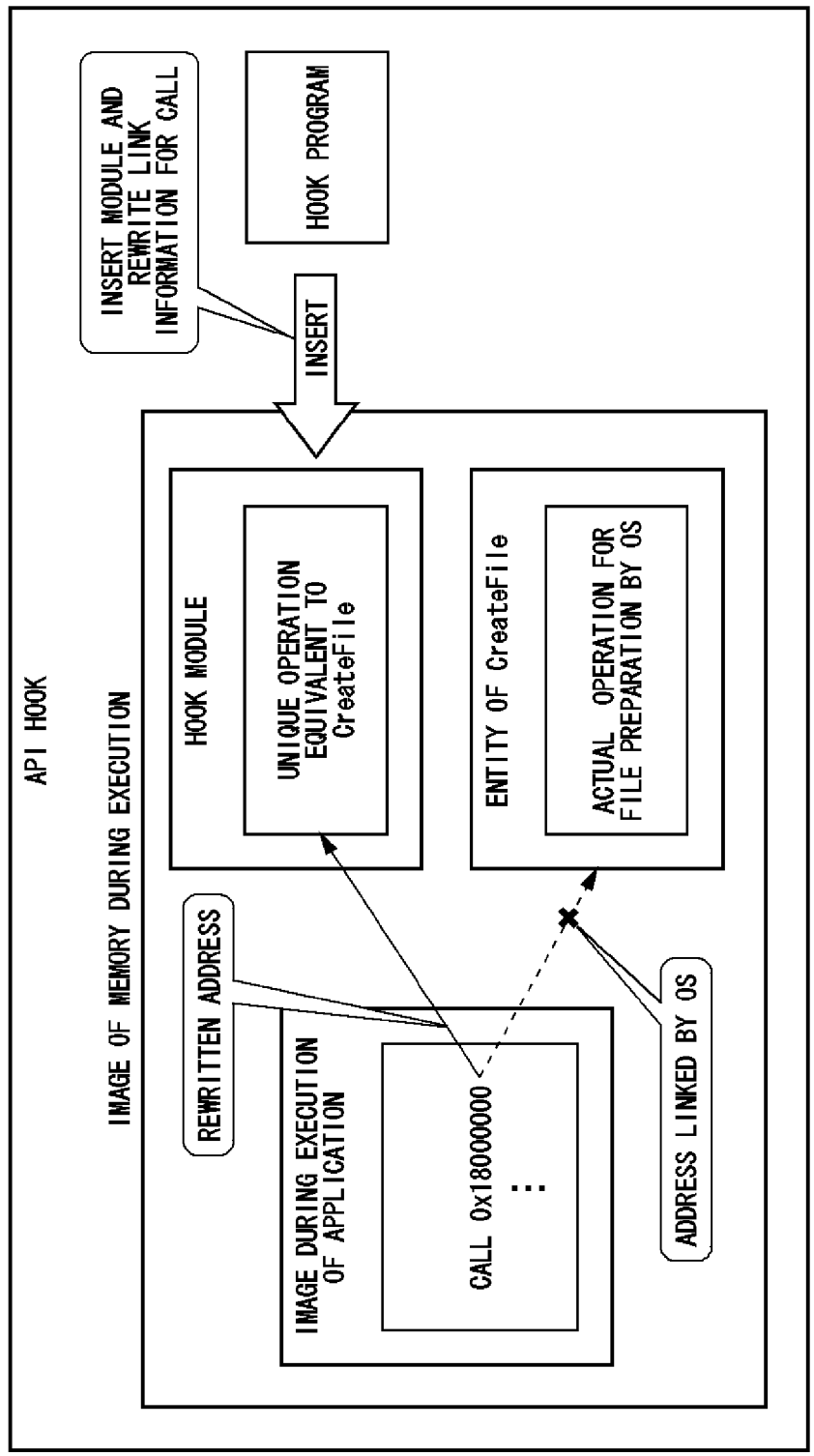
FIG. 11 is a schematic view illustrating the idea of API hook.

(3) Here, as shown in FIG. 11, a unique program fragment (module) can be inserted into the program executable memory space and the linking information between the API names and the addresses may be rewritten. In this way, a different operation than the entity of CreateFile API, which is originally intended to be called, can be performed. This is referred to as "API hook". By utilizing this technique, when an application attempts to call an OS function such as CreateFile API, a unique operation based on a hook module inserted from outside can be alternatively performed. The hook module knows the location on the memory of the "CreateFile API", which is originally intended to be called, and thus can request the originally-intended CreateFile API to perform operations, if required.

In the above, the API hook is generally described.

"Detailed Description of the Operations Performed in the Steps D8 to D10"

Figure 12:
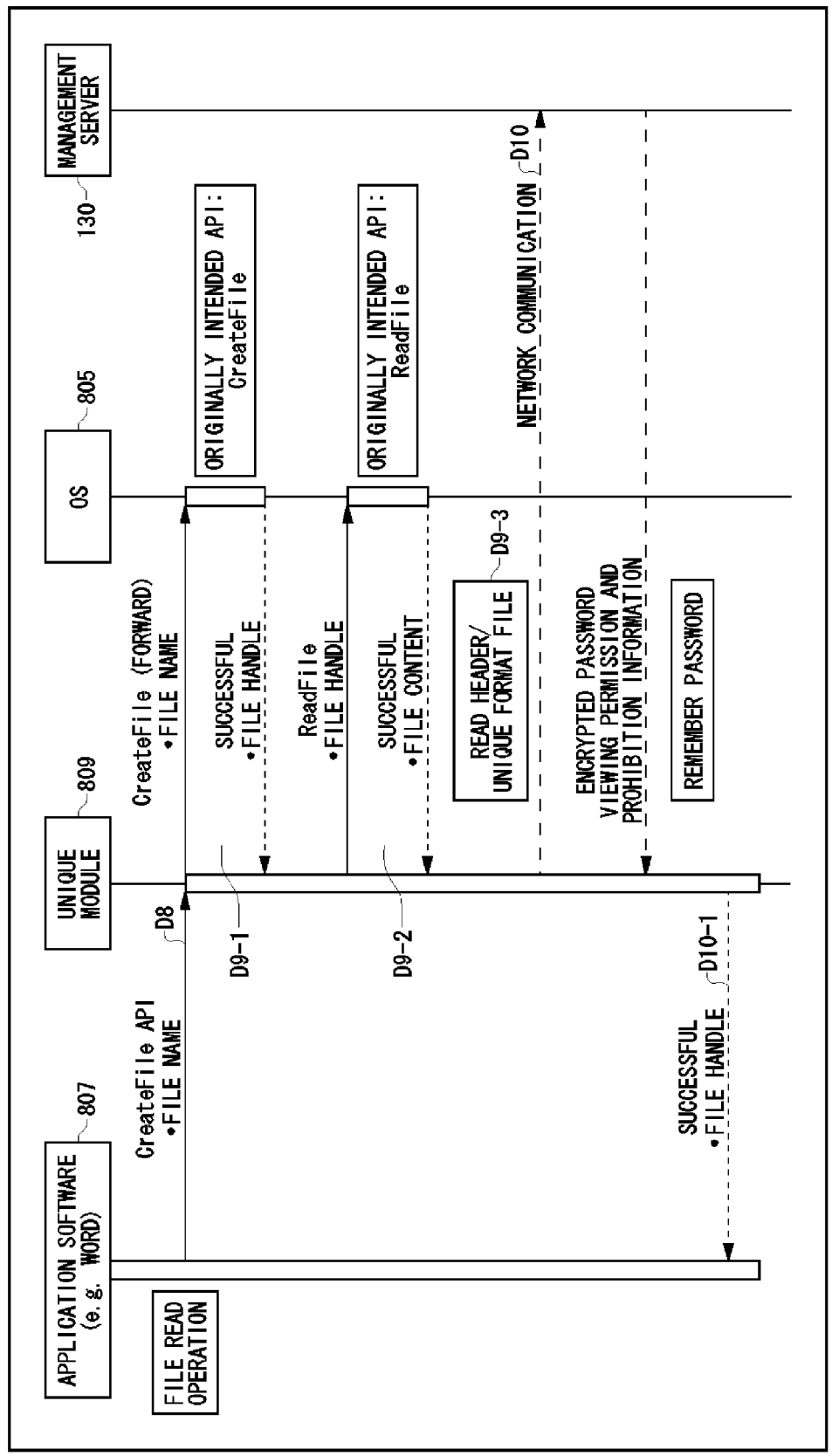
FIG. 12 is a flow diagram illustrating the operations performed in the steps D8 to D10 of the electronic file sending method relating to the second embodiment of the present invention, with a focus on API hook.

FIG. 12 is a flow diagram illustrating the operations performed in the steps D8 to D10 with a focus on API hook. With reference to FIGS. 8 and 12, in the step D8, the particular application 807 designates the file name and attempts to call CreateFile API in order to access the content of the file. Actually, however, in the step D9, the operations of the unique hook module 809 called by the API hook are performed. Specifically speaking, the unique hook module 809 designates a file name, calls CreateFile API, and opens the electronic file 801 in a step D9-1. In a step D9-2, the unique hook module 809 designates the identifier of the opened file 801, calls ReadFile API, and obtains the content of the opened file. The unique hook module 809 reads the header portion 802 of the electronic file 801. When detecting that the electronic file 801 has the unique format, in the step D10, the unique hook module 809 sends to the management server 130 the electronic mail address of the receiver Y and the file identifier. In this manner, the unique hook module 809 obtains from the management server 130 the encrypted password 702.

After this, the unique hook module 809 decrypts the encrypted electronic file 801 to obtain the content of the electronic file 501 on the memory. The obtained content of the electronic file 501 is stored and retained on the memory (temporary storage region), and returned to the particular application 807, on the memory, as shown as a step D10-1.

In the above, the steps D8 to D10 are described.

Subsequently, in a step D11, the unique hook module 809 also receives from the management server 130 the viewing permission and prohibition information stored (in the step A7) in association with the file identifier. The viewing permission and prohibition information is equivalent to the information input by the sender X in the step D2 (i.e., step A4).

Figure 13:
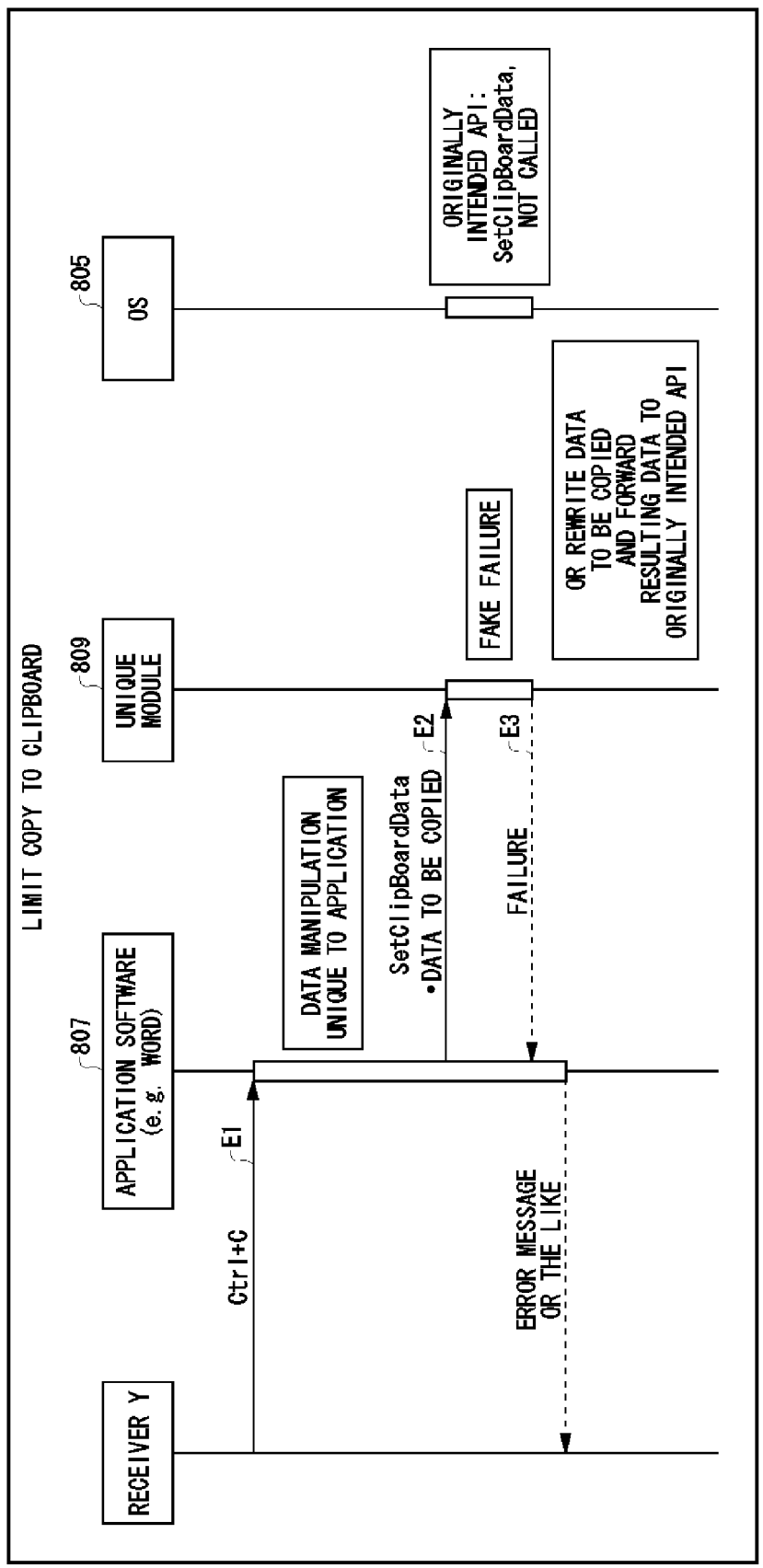
FIG. 13 is a flow diagram illustrating the operations to limit the clipboard manipulation performed by a receiver on an electronic file in the electronic file sending method relating to the second embodiment of the present invention.

By referring to the received viewing permission and prohibition information, the unique hook module 809 can permit and/or prohibit the receiver Y to perform/from performing given operations (for example, edition, printing, clipboard manipulation and the like) on the electronic file 501, exactly as intended by the sender X. FIG. 13 illustrates in detail how to realize such a control. FIG. 13 is a flow diagram illustrating the operations to limit the clipboard manipulation performed by the receiver on the electronic file in the electronic file sending method relating to the second embodiment of the present invention.

As described above, since the particular application 807 is activated, the operations of the API modules called by the application 807 are replaced with the operations of the unique hook module 809 based on the API hook technique.

If the receiver Y presses the "Ctrl" key and the "C" key in a step E1 in order to perform clipboard manipulation at this stage, the application 807 calls SetClipBoardData API in a step E2. Actually, however, in a step E3, the unique hook module 809 returns "failure" and the application 807 presents an error message or the like to the receiver Y in a step E4.

In this manner, the receiver Y is prohibited from performing clipboard manipulation on the electronic file 501.

Similarly, the application 807 calls GetDC API when the electronic file 501 is desired to be printed out and a series of APIs, CreateFile, WriteFile, and CloseHandle when the electronic file 501 is desired to be saved under a different name. In response to these API calls, the API hook causes the unique hook module 809 to perform unique operations to prohibit the electronic file 501 from being printed out or saved under a different name.

On the other hand, the receiver Y may be permitted to perform given manipulations on the electronic file 501. In this case, when the application 807 calls the API modules corresponding to the given manipulations, the unique hook module 809 may forward the call to the API modules. If such is the case, the result of the operations of the API modules is returned to the application 807 by the unique hook module 809 on the memory.

Returning back to FIG. 8, the unique hook module 809 monitors whether the particular application 807 calls an API, to detect, for example, that the receiver Y performs a particular manipulation (a particular API is called) and sends the detection result to the management server 130. Specifically speaking, the unique hook module 809 can send to the management server 130 the identifier of the electronic file and manipulation information indicative of a particular manipulation (as well as the time at which the manipulation is performed) as shown as a step D12. The management server 130 stores the manipulation information (manipulation log) in association with the identifier of the electronic file on the database 330a. Furthermore, the sender X can access the management server 130 through the sending apparatus 110 to know what manipulations have been performed by the receiver Y on the electronic file the sender X has sent, as shown in a step D13. In this manner, the sender X can track the manipulations performed by the receiver Y on the electronic file sent by the sender X and the time at which the manipulations are performed.

Furthermore, the sender X can access the management server 130 through the sending apparatus 110 to change the viewing permission and prohibition information stored on the management server 130 in association with identifiers at any time, as shown in a step D 14.

According to the first embodiment described earlier, it is only a correct receiver intended by a sender who can receive and open an electronic file sent from the sender. However, there is still a chance that the correct receiver may pass the obtained electronic file to a third person who is not intended by the sender.

According to the second embodiment, the receiving apparatus does not output, as a file, the electronic file obtained by decryption. Instead, the receiving apparatus employs API hook when reading the encrypted electronic file so that the unique hook module decrypts the encrypted electronic file on a memory (a temporary storage region). Therefore, the content of the electronic file obtained by the decryption is not kept as a file in an externally readable format. In other words, the content of the electronic file is stored on the memory but is not stored in a fixed storage region such as a hard disk.

Furthermore, the APIs for file manipulations that may possibly leak the content of the electronic file, such as file export, printing and clipboard manipulation are hooked on the memory so that these manipulations can be permitted and/or limited (prohibited). In this way, the second embodiment of the present invention can prevent the content of the electronic file from being leaked.

In the receiving apparatus, the API hook causes the unique hook module to monitor whether the particular application calls APIs and notifies the management server of the calls. In this manner, the management server can keep a record of a receiver, a manipulation, and a time in association with each other. As a result, by accessing the management server, the sender can easily and reliably track the manipulations (for example, file open, viewing, printing, clipboard manipulation, and the like) performed by the receiver on the electronic file.

What is claimed is:

1. An electronic file sending method comprising:
receiving at a first server a first encrypted password from a sending apparatus, the first encrypted password being a password first encrypted by the sending apparatus using a first public key and being necessary to decrypt an encrypted electronic file, the encrypted electronic file included in an electronic mail sent from the sending apparatus to a receiving apparatus through a second server;
first decrypting at the first server the first encrypted password using a first secret key corresponding to the first public key to obtain the password;
second encrypting using a second public key at the first server the obtained password;
sending the second encrypted password from the first server to the receiving apparatus, the second encrypted password being second decrypted by the receiving apparatus using a second secret key corresponding to the second public key to obtain the password;
storing, in association with each other, at the first server (i) file identifying information identifying the encrypted electronic file and (ii) receiver identifying information identifying a correct receiver of the encrypted electronic file;

sending a data sequence to the receiver identified by the receiver identifying information;

receiving from the receiving apparatus at the first server (I) an encrypted data sequence that is generated by using the second secret key and (II) the second public key; and storing at the first server the second public key in association with the receiver identifying information when the data sequence sent to the receiver matches a data sequence obtained by decrypting the encrypted data sequence using the second public key.

2. The electronic file sending method as set forth in claim 1, wherein the sending apparatus uses a first secret key to first encrypt the password;

wherein the first decrypting includes using the first secret key;

wherein the second encrypting includes using a second secret key; and wherein the receiving apparatus second decrypts the second encrypted password to obtain the password, by using the second secret key.

3. The electronic file sending method as set forth in claim 1, further comprising:

receiving at the first server from the receiving apparatus (i) received file identifying information identifying the encrypted electronic file that is received at the receiving apparatus and (ii) user identifying information identifying a user of the receiving apparatus; and determining at the first server whether the user of the receiving apparatus is the correct receiver of the encrypted electronic file based on (I) file identifying information identifying the encrypted electronic file, (II) receiver identifying information that is for identifying the correct receiver of the encrypted electronic file and that is associated with the file identifying information, (III) the received file identifying information, and (IV) the user identifying information, wherein the sending the second encrypted password is performed only when determining that the user of the receiving apparatus is the correct receiver.

4. The electronic file sending method as set forth in claim 1, further comprising:

receiving from the receiving apparatus at the first server a request signal requesting the password when the receiving apparatus opens the encrypted electronic file included in the electronic mail; and sending to the receiving apparatus from the first server the second encrypted password;

wherein the receiving apparatus second decrypts the second encrypted password to obtain the password, and decrypts the encrypted electronic file, by using the obtained password; and wherein the sending the second encrypted password is in response to reception of the request signal at the first server from the receiving apparatus.

5. A non-transitory computer-readable medium having instructions stored thereon which, when executed by at least one processor, cause the at least one processor to perform operations comprising:

receiving an electronic mail including an encrypted electronic file from a sending apparatus through a second server;

receiving from a first server a password that is necessary to decrypt the encrypted electronic file;

receiving from the first server permission and prohibition information indicating an operation that is permitted to be performed or prohibited from being performed on a decrypted electronic file obtained by decrypting the electronic file;

decrypting the encrypted electronic file using the password to store the decrypted electronic file in a temporary storage region;

performing an operation on the decrypted electronic file stored in the temporary storage region, by referring to the permission and prohibition information; and calling a unique hook module based on an API hook when a particular application is activated;

wherein when the particular application calls a given API module for an operation that is permitted by the permission and prohibition information, the unique hook module forwards the call to the given API module and returns to the particular application a result of an operation of the given API module.

6. The non-transitory computer-readable medium as set forth in claim 5, having a further instruction stored thereon which, when executed by the least one processor, cause the at least one processor to call a unique hook module based on an API hook when a particular application calls an API module for reading the encrypted electronic file, and in the temporary storage region, the unique hook module decrypts the encrypted electronic file to store the electronic file and returns a content of the electronic file to the particular application.

7. The non-transitory computer-readable medium as set forth in claim 6, wherein the unique hook module returns the content of the electronic file to the particular application in the temporary storage region, without generating the content of the electronic file in a fixed storage region.

8. The non-transitory computer-readable medium as set forth in claim 5, wherein when the particular application calls an API module for an operation that is prohibited by the permission and prohibition information, the unique hook module returns a failure to the particular application.

9. The non-transitory computer-readable medium as set forth in claim 5, having a further instruction stored thereon which, when executed by the least one processor, cause the at least one processor to send to the first server manipulation information indicating a manipulation on the electronic file stored in the temporary storage region.

10. The non-transitory computer-readable medium as set forth in claim 9, wherein the manipulation information is stored on the first server, and the sending apparatus is allowed to view the manipulation information stored on the first server.

11. The non-transitory computer-readable medium as set forth in claim 5, wherein the permission and prohibition information is stored on the first server, and the permission and prohibition information stored on the first server is determined by the sending apparatus.

12. The non-transitory computer-readable medium as set forth in claim 5, wherein the permission and prohibition information is received from the first server when the encrypted electronic file is read, and the operation is performed on the electronic file stored in the temporary storage region, by referring to the permission and prohibition information.

* * * * *